United States Patent [19]

Herrmann et al.

[11] 3,927,950
[45] Dec. 23, 1975

[54] HALF-LAPPED TUBE JOINT

[75] Inventors: John R. Herrmann, Tustin; Robert L. Alexander, Newport Beach, both of Calif.

[73] Assignee: G.S. Beckwith Gilbert, Greenwich, Conn.

[22] Filed: Jan. 24, 1975

[21] Appl. No.: 543,825

[52] U.S. Cl. .................. 403/346; 52/726; 29/525; 403/282; 403/382
[51] Int. Cl.² .... F16B 7/04; F16D 1/00; B25G 3/00
[58] Field of Search .......... 403/346, 382, 403, 285, 403/170, 173, 174, 177, 178, 267, 272, 282, 400; 52/758 R, 753 D, 664, 668, 720; 246/164, 188.1, 188.91; 211/182; 29/525; 46/28; 113/116 UT; 72/367

[56] References Cited
UNITED STATES PATENTS

| | | | |
|---|---|---|---|
| 1,022,387 | 4/1912 | Czimeg | 403/346 |
| 1,024,001 | 4/1912 | Forsyth | 52/668 |
| 2,221,934 | 11/1940 | Ferris | 403/170 |
| 2,509,732 | 5/1950 | Ernestus | 52/668 X |
| 2,918,995 | 12/1959 | Krueger | 52/668 |
| 3,589,439 | 6/1971 | Huggins et al. | 52/668 X |
| 3,623,936 | 11/1971 | Hotz | 52/668 X |
| 3,748,814 | 7/1973 | Cribben | 52/668 |
| 3,835,354 | 9/1974 | Torres-Pina | 211/182 X |

FOREIGN PATENTS OR APPLICATIONS 97,907   2/1964   Denmark

Primary Examiner—Werner H. Schroeder
Assistant Examiner—Wayne L. Shedd

[57] ABSTRACT

The joinder of crossed members by the formation in at least one member of a notch established by the piercing and shearing of one flat wall and the bending of adjacent walls to a bottom plane displaced from the remaining flat wall, a second member being received in said notch, and advantageously employed by the formation of like notches in both crossed members and which are complementary, the crossed members thereby retaining their structural continuity without the production of scrap, and adapted to be integrally welded one to the other.

9 Claims, 5 Drawing Figures

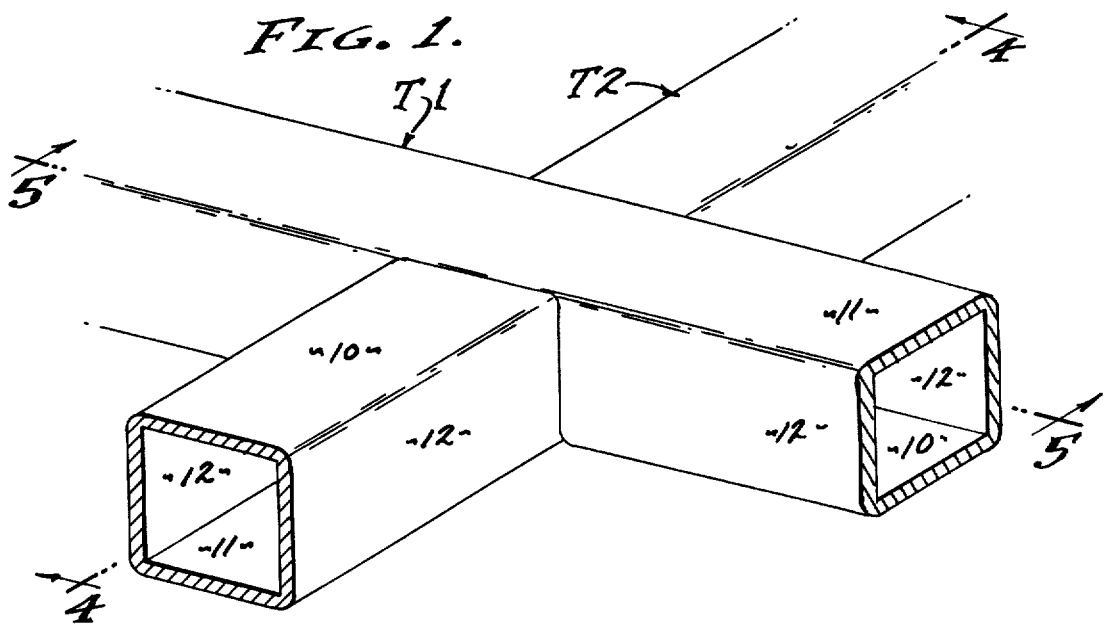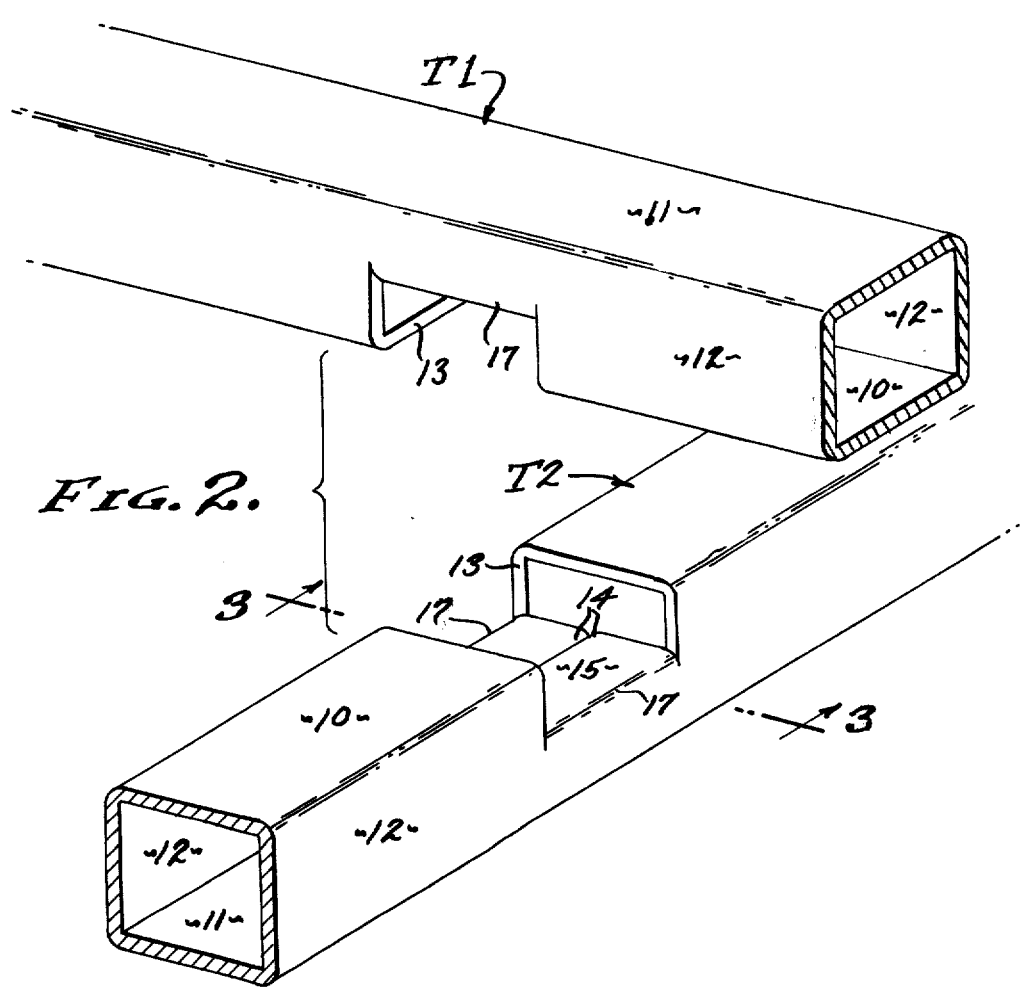

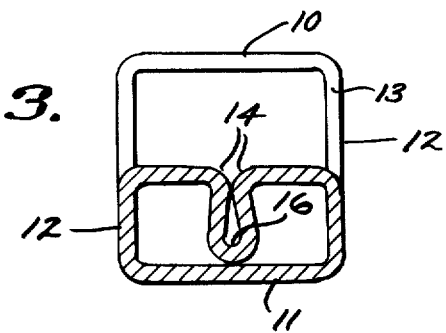
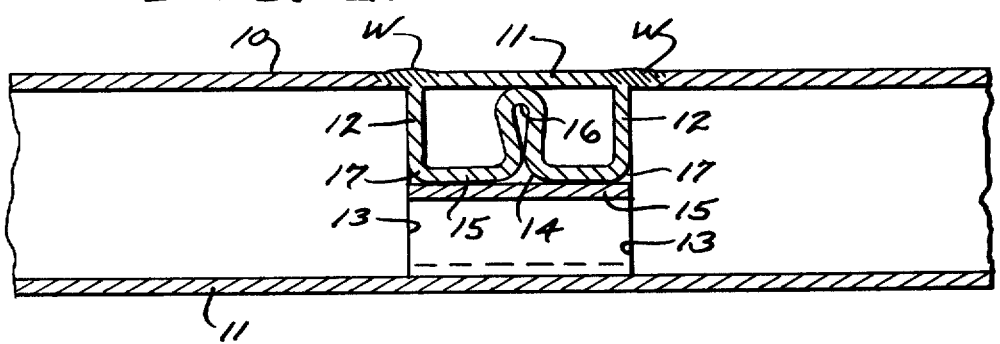
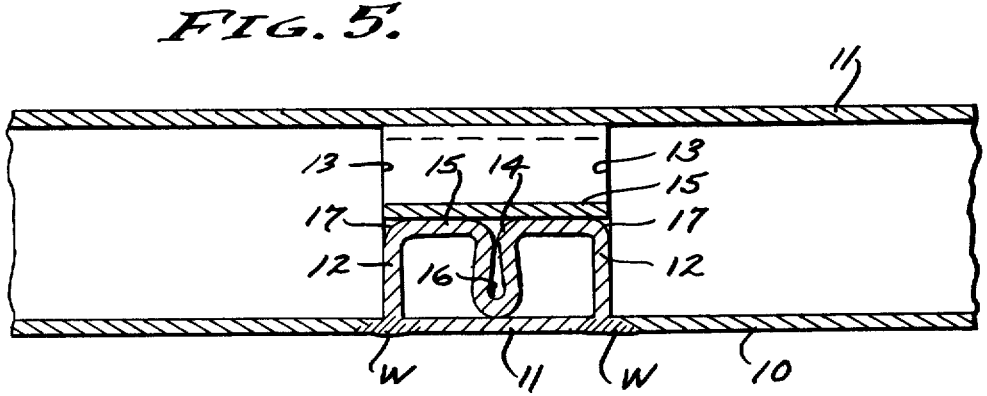

HALF-LAPPED TUBE JOINT

This application is co-pending with our application Ser. No. 515,498 filed Oct. 17, 1974 and entitled LOAD BEARING PALLET AND METHOD OF ITS CONSTRUCTION.

BACKGROUND

The crossed joinder of structural members, such as grid systems for windows and any such frame work, brings about problems in cutting and fitting and difficulties in maintaining dimension and geometric stability. For example, interruptions in a member to pass another member requires some mode of refastening for the establishment of structural integrity; and all of which is time consuming and costly, and in many cases unsightly and combersum. The structural members that are crossed may be decorative or purely utilitarian and the continuity of the planar surfaces thereof is often a requirement; and in this respect we are concerned herein with the reformation of a flat planar wall and a pair of adjacent walls in such a member. Although open channel members qualify to be reformed as hereinafter disclosed, and though it is feasible to cross members of dissimilar cross section, this invention will be described in its preferred and simplified embodiment wherein the crossed members are square tubes of identical cross section.

FIELD OF INVENTION

There is great advantage to be derived in maintaining the continuity of crossed members, both from an appearance and a structural view point. At least one of the crossed members has a flat planar side with adjoining side walls, which together are reformed to present a notch that receives the crossing members. Accordingly, it is an object of this invention to provide the reformation of a continuous structural member to provide a notch therein for the reception of a second crossing structural member.

The reduction and/or elimination of scrap is much to be desired when joining structural members. For example, a member that is cut most often produces waste in the form of chips, as when holes are punched or drilled for fastening therethrough. Therefore, it is an object of this invention to provide a method that virtually eliminates scrap by piercing and forming and by establishing a notch or mating notches that are adapted to be fitted and pressed or snapped together.

The discontinuity of structural members is to be avoided, and strength maintained or replaced at weakened portions. To this end, it is an object of this invention to preserve the structure as much as possible, simply by displacing the wall portions that are moved to provide the said notch. With the present invention, the walled displacement is such as to establish a bottom for the notch thus formed, and upon assembly the crossed members can be welded so as to fully re-establish planar continuity of the walls through one member and into the other.

DRAWINGS

The various objects and features of this invention will be fully understood from the following detailed description of the typical preferred form and application thereof, throughout which description reference is made to the accompanying drawings, in which:

FIG. 1 is an enlarged perspective view of the crossed tube joint of the present invention.

FIG. 2 is an exploded view of the members as they are illustrated in FIG. 1.

FIG. 3 is a transverse sectional view taken as indicated by line 3—3 on FIG. 2.

FIG. 4 is a longitudinal sectional view of one member taken as indicated by line 4—4 on FIG. 1, and FIG. 5 is a longitudinal sectional view of the other member taken as indicated by line 5—5 on FIG. 1.

PREFERRED EMBODIMENT

This invention relates to the formation of a notch and especially mating notches in elongated members having planar top and depending side walls. In accordance with this method of reforming the said planar walls of the initially formed members, piercing and bending steps are employed as will be described and which result in notching and adaptability to complementary crossed joinder of said tube members. As shown, the members are tubular structural members disposed with their top walls in coplanar relation.

The members to be crossed are designated T1 and T2, both being shown as identically cross sectioned tubes having top and bottom walls 10 and 11 and opposite side walls 12. One of the walls is to be displaced and a portion thereof reformed as a notch, and for this purpose it is the wall 10 that is reformed together with adjoining portions of the opposite and adjacent side walls 12. It is to be understood that members of various cross section can be reformed with the pierce and form method hereinafter described, providing said member has at least one top wall 10 and the opposite and adjoining side walls 12 related thereto as shown. For example, a channel section qualifies, as well as other rectangular cross sections, and any cross section which includes the aforementioned relationship of walls 10 and 12. In practice, maleable members are to be reformed and crossed, such as for example, steel and any such metal members that are customarily roll-formed or extruded.

Referring now to the notch formation which is essential to at least one member T1 or T2 when practicing this invention, there is a reformation of the top wall 10 to a plane displaced inwardly from and parallel to the top 10. The purpose of said reformation is to establish a notch of rectangular configuration having opposed transverse faces 13 that are parallel one with the other, and a bottom 15 in a plane displaced from and parallel with the remaining top wall 10. It will be observed that a portion of each wall 12 is bent or deflected inwardly a distance equal to half the distance between remaining side walls 12, preferrably touching and/or juxtapositioned at the center of bottom 15 which is established thereby. Square tube members afford the optimum situation wherein the initially formed corners 14 of the tube member are retained substantially in their right angular configuration by center folding the top at 16 and depressing the top preliminary to full depression in forming the bottom 15 into final position with the fold 16 touching the inside face of wall 11, as shown throughout the drawings.

In accordance with the preferred embodiment, the notches are identically formed in the members T1 and T2 of identical cross section, each notch being formed to the mid plane of the tubular cross section thereof respectively. A feature of the notch is the "pierce and form" method of formation thereof which preserves the metal wall without the production of scrap, while utilizing the displaced portions of the side walls 12 to establish the bottom 15 of the notch. As shown, the rectangular or square tube is pierced along a pair of spaced parallel lines at the top wall 10, and the walls 12 are sheared to the mid plane of the member. The flat top wall 10 is folded inwardly at its center portion or fold 16 and retains its initial corner formation at 14, while being right angularly bent at 17 to establish the bottom 15 at said mid plane of the tube. The aforementioned shear lines are spaced and opposed so as to establish the opposed notch walls 13 which are subsequently pressed together in the assembly of complementary tubes T1 and T2 for tight co-planar engagement.

In carrying out the invention, upwardly and downwardly faced notches are provided in the two members T1 and T2 respectively, to be crossed and thereby joined together. When members of identical cross section are employed, the top and bottom walls 10 and 11 thereof are coplanar respectively, in which case welding W along the lines of joinder, preferably all lines of joinder as shown, establishes "box-section" continuity from one member through the other, for maximum strength. However, it is to be understood that there are non-structural installations wherein a slide or press fit of the two notches together will suffice.

From the foregoing it will be seen that the joinder of crossed members is clean and simple, there is no formation of scrap, and one notched member complements the other. Although the top wall of one member can be in a plane off-set from that of the other member, there is the unique feature of the coplanar continuity of either or both the top and bottom walls, whereby decorative appearance is enhanced by means of fitting without visible means of joinder, or whereby welding or the like is applied to re-establish a maximum strength configuration.

Having described only a typical preferred form and application of our invention, we do not wish to be limited or restricted to the specific details herein set forth, but wish to reserve to ourselves any modifications or variations that may appear to those skilled in the art:

We claim:

1. A notch in an elongated hollow member having a planar top wall and spaced planar and parallel side walls depending from the top wall, portions of the top wall and spaced side walls being displaced along transverse and vertically disposed shear lines respectively, the center of the top wall being folded downwardly, the displaced side wall portions being folded inwardly to a plane disposed beneath and parallel to the remaining top wall, and the displaced top wall portion being disposed in the form of a fold depending from the notch bottom established by the two displaced and juxtaposed side wall portions.

2. The notch in an elongated member as set forth in claim 1, wherein the shear lines are parallel transverse lines continuing vertically into the shear lines of the side walls.

3. The notch in an elongated member as set forth in claim 1, wherein said member is tubular with a bottom wall spaced from the top wall, and wherein the displaced portion of the top wall depends into stopped engagement with the bottom wall.

4. The notch in an elongated member as set forth in claim 1, wherein the said member is tubular with a bottom wall spaced from the top wall, wherein the shear lines are parallel transverse lines continuing vertically into the shear lines of the side walls, and wherein the displaced portion of the top wall depends into stopped engagement with the bottom wall.

5. A pair of complementary hollow crossed elongated members each notched to receive a portion of the other and each having a planar top wall and spaced planar and parallel side walls depending from the top wall, portions of the top wall and spaced side walls being severed and displaced along transverse and vertically disposed shear lines respectively, the remaining, undisplaced, adjacent portions of said walls forming opposed notch edge, the center of the top wall being folded downwardly, the displaced side wall portions being folded inwardly to a plane disposed beneath and parallel to the remaining top wall, and the displaced top wall portion being disposed in the form of a fold depending from the notch bottom established by the two displaced and juxtaposed side wall portions, the notched portion of each member being received in the notched portion of the other member crossed therewith respectively, the axial spacing between the opposed edges of each notch being less than the width of the other member inserted therein, whereby when the members are joined the edges of each notch engage the other member inserted therein, with a tight, force-fitting grip.

6. The complementary crossed members as set forth in claim 1, wherein the displacement of the said notch bottom from the top wall of one member is equal to the remaining depth of the notched portion of the other member.

7. The complementary crossed members as set forth in claim 1, wherein the elongated members are tubular with spaced top and bottom walls, and wherein the displacement of the said notch bottom from the top wall of one member is equal to the remaining depth of the notched portion of the other member, the top wall of one member being co-planar with the bottom wall of the other member respectively.

8. The complementary crossed members as set forth in claim 1, wherein the displacement of the said notch bottom from the top wall of one member is equal to the remaining depth of the notched portion of the other member.

9. The complementary crossed members as set forth in claim 1, wherein the elongated members are tubular with spaced top and bottom walls, and wherein the displacement of the said notch bottom from the top wall of one member is equal to the remaining depth of the notched portion of the other member, the top wall of one member being co-planar with the bottom wall of the other member respectively.

* * * * *